US008954687B2

(12) United States Patent
Jeddeloh

(10) Patent No.: US 8,954,687 B2
(45) Date of Patent: *Feb. 10, 2015

(54) MEMORY HUB AND ACCESS METHOD HAVING A SEQUENCER AND INTERNAL ROW CACHING

(75) Inventor: Joseph M. Jeddeloh, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 642 days.

This patent is subject to a terminal disclaimer.

(21) Appl. No.: 11/139,274

(22) Filed: May 27, 2005

(65) Prior Publication Data

US 2005/0223161 A1  Oct. 6, 2005

Related U.S. Application Data

(63) Continuation of application No. 10/213,038, filed on Aug. 5, 2002, now Pat. No. 7,117,316.

(51) Int. Cl.
*G06F 13/00* (2006.01)
*G06F 13/16* (2006.01)
*G06F 12/08* (2006.01)

(52) U.S. Cl.
CPC .......... *G06F 13/161* (2013.01); *G06F 12/0893* (2013.01); *G06F 12/0862* (2013.01)
USPC ............... 711/154; 711/118; 711/5; 711/105; 711/109

(58) Field of Classification Search
CPC ............ G11C 7/1039; G11C 11/4096; G11C 2207/2245; G11C 7/1012; G11C 8/04; G06F 13/28; G06F 13/1626
USPC .............. 711/154, 118, 105, 109, 5; 709/214; 345/557

See application file for complete search history.

(56) References Cited

U.S. PATENT DOCUMENTS

| 4,045,781 A | 8/1977 | Levy et al. ..................... 364/200 |
| 4,240,143 A | 12/1980 | Besemer et al. .............. 364/200 |

(Continued)

FOREIGN PATENT DOCUMENTS

| EP | 0395559 A2 | 10/1990 |
| EP | 0843261 A2 | 5/1998 |

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner* — Hong Kim
(74) *Attorney, Agent, or Firm* — Dorsey & Whitney LLP

(57) ABSTRACT

A computer system includes a controller coupled to a plurality of memory modules each of which includes a memory hub and a plurality of memory devices. The memory hub includes a row cache memory that stores data as they are read from the memory devices. When the memory module is not being accessed by the controller, a sequencer in the memory module generates requests to read data from a row of memory cells. The data read responsive to the generated read requests are also stored in the row cache memory. As a result, read data in the row being accessed may be stored in the row cache memory even though the data was not previously read from the memory device responsive to a memory request from the controller.

25 Claims, 2 Drawing Sheets

(56) References Cited

U.S. PATENT DOCUMENTS

| | | | |
|---|---|---|---|
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | |
| 4,707,823 A | 11/1987 | Holdren et al. | 370/1 |
| 4,724,520 A | 2/1988 | Athanas et al. | 364/200 |
| 4,891,808 A | 1/1990 | Williams | |
| 4,930,128 A | 5/1990 | Suzuki et al. | 371/12 |
| 4,953,930 A | 9/1990 | Ramsey et al. | 350/96.11 |
| 5,133,059 A | 7/1992 | Ziegler et al. | 395/425 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,305,389 A | 4/1994 | Palmer | |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | |
| 5,355,391 A | 10/1994 | Horowitz et al. | 375/36 |
| 5,421,000 A | 5/1995 | Fortino et al. | |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,465,343 A * | 11/1995 | Henson et al. | 711/112 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,613,075 A | 3/1997 | Wade et al. | 395/287 |
| 5,638,334 A | 6/1997 | Farmwald et al. | 365/230.03 |
| 5,638,534 A | 6/1997 | Mote, Jr. | 395/485 |
| 5,659,713 A | 8/1997 | Goodwin et al. | |
| 5,659,798 A | 8/1997 | Blumrich et al. | 395/846 |
| 5,706,224 A | 1/1998 | Srinivasan et al. | |
| 5,715,456 A | 2/1998 | Bennett et al. | 395/652 |
| 5,729,709 A | 3/1998 | Harness | 395/405 |
| 5,748,616 A | 5/1998 | Riley | |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,838,931 A | 11/1998 | Regenold et al. | 395/308 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,889,714 A | 3/1999 | Schumann et al. | 365/203 |
| 5,928,343 A | 7/1999 | Farmwald et al. | 710/104 |
| 5,953,743 A | 9/1999 | Jeddeloh | |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,006,340 A | 12/1999 | O'Connell | 713/600 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,125,431 A | 9/2000 | Kobayashi | 711/154 |
| 6,128,703 A | 10/2000 | Bourekas et al. | 711/138 |
| 6,128,706 A | 10/2000 | Bryg et al. | 711/141 |
| 6,131,149 A | 10/2000 | Lu et al. | |
| 6,134,624 A | 10/2000 | Burns et al. | 710/131 |
| 6,134,643 A | 10/2000 | Kedem et al. | |
| 6,137,709 A | 10/2000 | Boaz et al. | 365/51 |
| 6,144,587 A | 11/2000 | Yoshida | 365/189.05 |
| 6,145,033 A | 11/2000 | Chee | 710/57 |
| 6,157,743 A | 12/2000 | Goris et al. | 382/233 |
| 6,157,962 A | 12/2000 | Hodges et al. | 710/1 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | |
| 6,212,590 B1 | 4/2001 | Melo et al. | |
| 6,216,178 B1 | 4/2001 | Stracovsky et al. | 710/6 |
| 6,216,219 B1 | 4/2001 | Cai et al. | 712/207 |
| 6,223,259 B1 | 4/2001 | Zervens et al. | |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,252,821 B1 * | 6/2001 | Nizar et al. | 711/202 |
| 6,256,692 B1 | 7/2001 | Yoda et al. | 710/104 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,330,639 B1 | 12/2001 | Fanning et al. | 711/106 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | |
| 6,434,696 B1 | 8/2002 | Kang | |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,460,108 B1 | 10/2002 | McCoskey et al. | 710/310 |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,467,013 B1 * | 10/2002 | Nizar | 711/1 |
| 6,470,422 B2 | 10/2002 | Cai et al. | 711/129 |
| 6,473,828 B1 | 10/2002 | Matsui | 711/104 |
| 6,477,592 B1 * | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,628 B1 | 11/2002 | Duong et al. | 710/313 |
| 6,490,188 B2 | 12/2002 | Nuxoll et al. | 365/63 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,502,161 B1 * | 12/2002 | Perego et al. | 711/5 |

(56) References Cited

U.S. PATENT DOCUMENTS

| | | | |
|---|---|---|---|
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,553,476 B1 | 4/2003 | Ayaki et al. | 711/204 |
| 6,564,329 B1 | 5/2003 | Cheung et al. | |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,611,884 B2 | 8/2003 | Castellano | |
| 6,615,325 B2 | 9/2003 | Mailloux et al. | 711/154 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,633,959 B2 | 10/2003 | Arimilli et al. | 711/141 |
| 6,636,110 B1 | 10/2003 | Ooishi et al. | 327/565 |
| 6,646,929 B1 | 11/2003 | Moss et al. | 365/194 |
| 6,647,470 B1 | 11/2003 | Janzen | 711/154 |
| 6,658,509 B1 | 12/2003 | Bonella et al. | 710/100 |
| 6,662,304 B2 | 12/2003 | Keeth et al. | 713/400 |
| 6,665,202 B2 | 12/2003 | Lindahl et al. | |
| 6,667,895 B2 | 12/2003 | Jang et al. | 365/63 |
| 6,681,292 B2 | 1/2004 | Creta et al. | 711/119 |
| 6,681,302 B2 | 1/2004 | Cho et al. | 711/154 |
| 6,697,926 B2 | 2/2004 | Johnson et al. | 711/167 |
| 6,704,817 B1 | 3/2004 | Steinman et al. | 710/100 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,748,493 B1 | 6/2004 | Arroyo et al. | |
| 6,751,703 B2 | 6/2004 | Chilton | 711/113 |
| 6,754,117 B2 | 6/2004 | Jeddeloh | |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,772,295 B2 | 8/2004 | Spencer et al. | 711/137 |
| 6,775,747 B2 | 8/2004 | Venkatraman | 711/137 |
| 6,779,036 B1 | 8/2004 | Deshpande | |
| 6,782,466 B1 | 8/2004 | Steele et al. | 711/209 |
| 6,788,104 B2 | 9/2004 | Singh et al. | 326/39 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | |
| 6,823,023 B1 | 11/2004 | Hannah | |
| 6,829,705 B2 | 12/2004 | Smith | 713/1 |
| 6,832,303 B2 | 12/2004 | Tanaka | |
| 6,845,409 B1 | 1/2005 | Talagala et al. | |
| 6,889,304 B2 | 5/2005 | Perego et al. | 711/170 |
| 6,910,109 B2 | 6/2005 | Holman et al. | |
| 6,928,528 B1 | 8/2005 | Hewitt | 711/156 |
| 6,941,433 B1 | 9/2005 | Libby et al. | 711/167 |
| 7,006,505 B1 | 2/2006 | Bleszynski et al. | |
| 7,107,415 B2 | 9/2006 | Jeddeloh et al. | |
| 7,117,316 B2 | 10/2006 | Jeddeloh | |
| 7,120,727 B2 | 10/2006 | Lee et al. | |
| 7,133,972 B2 | 11/2006 | Jeddeloh | |
| 7,188,219 B2 | 3/2007 | Jeddeloh | |
| 7,213,082 B2 | 5/2007 | Jeddeloh | |
| 7,249,236 B2 | 7/2007 | Jeddeloh et al. | |
| 7,254,075 B2 | 8/2007 | Woo et al. | 365/207 |
| 7,260,685 B2 | 8/2007 | Lee et al. | |
| 7,315,053 B2 | 1/2008 | Hosomi et al. | 257/295 |
| 7,318,130 B2 | 1/2008 | Morrow et al. | 711/154 |
| 7,330,992 B2 | 2/2008 | Jeddeloh et al. | |
| 7,343,444 B2 | 3/2008 | Lee et al. | |
| 7,353,320 B2 | 4/2008 | Jeddeloh | |
| 7,434,081 B2 | 10/2008 | Jeddeloh et al. | |
| 8,392,686 B2 | 3/2013 | Jeddeloh et al. | |
| 2001/0037428 A1* | 11/2001 | Hsu et al. | 711/105 |
| 2001/0039612 A1 | 11/2001 | Lee | 713/2 |
| 2002/0002656 A1 | 1/2002 | Honma et al. | 711/122 |
| 2002/0038405 A1* | 3/2002 | Leddige et al. | 711/115 |
| 2002/0078298 A1 | 6/2002 | Jeddeloh | 711/118 |
| 2002/0112119 A1 | 8/2002 | Halbert et al. | 711/115 |
| 2002/0116588 A1 | 8/2002 | Beckert et al. | 711/161 |
| 2002/0120709 A1 | 8/2002 | Chow et al. | 709/213 |
| 2002/0144064 A1 | 10/2002 | Fanning | 711/144 |
| 2002/0147884 A1* | 10/2002 | Peters | 711/105 |
| 2002/0178319 A1 | 11/2002 | Sanchez-Olea | 710/305 |
| 2003/0005223 A1 | 1/2003 | Coulson et al. | 711/118 |
| 2003/0014578 A1 | 1/2003 | Pax | 710/100 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | |
| 2003/0156639 A1 | 8/2003 | Liang | 375/270.01 |
| 2003/0158995 A1 | 8/2003 | Lee et al. | 711/105 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0215042 A1 | 11/2003 | Gauthier et al. | |
| 2003/0217223 A1 | 11/2003 | Nino, Jr. et al. | |
| 2003/0223295 A1 | 12/2003 | Ozguz et al. | 365/201 |
| 2003/0227798 A1 | 12/2003 | Pax | 365/189.12 |
| 2003/0229762 A1* | 12/2003 | Maiyuran et al. | 711/137 |
| 2003/0229770 A1 | 12/2003 | Jeddeloh | 711/213 |
| 2003/0235072 A1 | 12/2003 | Kim et al. | 365/158 |
| 2004/0006671 A1 | 1/2004 | Handgen et al. | 711/137 |
| 2004/0015666 A1 | 1/2004 | Rojas et al. | 711/159 |
| 2004/0019728 A1 | 1/2004 | Sharma | 710/306 |
| 2004/0022094 A1 | 2/2004 | Radhakrishnan et al. | 365/200 |
| 2004/0039886 A1 | 2/2004 | Christofferson et al. | 711/156 |
| 2004/0049649 A1 | 3/2004 | Durrant | 711/165 |
| 2004/0064602 A1 | 4/2004 | George | 710/22 |
| 2004/0122988 A1 | 6/2004 | Han et al. | 710/5 |
| 2004/0126115 A1 | 7/2004 | Levy et al. | 398/116 |
| 2004/0144994 A1 | 7/2004 | Lee et al. | 257/200 |
| 2004/0158677 A1 | 8/2004 | Dodd | 711/118 |
| 2004/0170196 A1 | 9/2004 | Susnow | 370/503 |
| 2004/0236885 A1 | 11/2004 | Fredriksson et al. | |
| 2004/0268061 A1 | 12/2004 | Khare et al. | 711/151 |
| 2005/0044327 A1 | 2/2005 | Howard et al. | |
| 2005/0060533 A1 | 3/2005 | Woo et al. | 713/100 |
| 2005/0066137 A1 | 3/2005 | Jeddeloh et al. | |
| 2005/0071542 A1 | 3/2005 | Weber et al. | 711/105 |
| 2005/0078506 A1 | 4/2005 | Rao et al. | 365/154 |
| 2005/0105350 A1 | 5/2005 | Zimmerman | 365/201 |
| 2005/0149774 A1 | 7/2005 | Jeddeloh et al. | |
| 2005/0172084 A1 | 8/2005 | Jeddeloh | |
| 2005/0216678 A1 | 9/2005 | Jeddeloh | |
| 2005/0223161 A1 | 10/2005 | Jeddeloh | |
| 2005/0246558 A1 | 11/2005 | Ku | 713/300 |
| 2005/0257005 A1 | 11/2005 | Jeddeloh | |
| 2006/0085616 A1 | 4/2006 | Zeighami et al. | 711/167 |
| 2006/0168407 A1 | 7/2006 | Stern | |
| 2006/0200642 A1 | 9/2006 | LaBerge | 711/167 |
| 2006/0206679 A1 | 9/2006 | Jeddeloh et al. | |
| 2006/0212655 A1 | 9/2006 | Jeddeloh | |
| 2006/0212666 A1 | 9/2006 | Jeddeloh | |
| 2006/0288172 A1 | 12/2006 | Lee et al. | 711/137 |
| 2007/0011392 A1 | 1/2007 | Lee et al. | 711/5 |
| 2007/0033353 A1 | 2/2007 | Jeddeloh | 711/154 |
| 2007/0055817 A1 | 3/2007 | Jeddeloh | |

(56) References Cited

U.S. PATENT DOCUMENTS

| | | |
|---|---|---|
| 2007/0088915 A1 | 4/2007 | Archambault et al. |
| 2007/0113027 A1 | 5/2007 | Jeddeloh ............... 711/154 |
| 2007/0271435 A1 | 11/2007 | Jeddeloh et al. |
| 2009/0013143 A1 | 1/2009 | Jeddeloh et al. |
| 2009/0125688 A1 | 5/2009 | Jeddeloh ............... 711/154 |
| 2013/0179658 A1 | 7/2013 | Jeddeloh et al. |
| 2013/0326164 A1 | 12/2013 | Jeddeloh |

FOREIGN PATENT DOCUMENTS

| | | |
|---|---|---|
| EP | 0 849 685 | 6/1998 |
| EP | 0849685 A2 | 6/1998 |
| EP | 1199637 A2 | 4/2002 |
| GB | 2 244 157 | 11/1991 |
| GB | 2244157 A | 11/1991 |
| JP | 02-232890 | 9/1990 |
| JP | 06-004401 | 1/1994 |
| JP | 06-028180 | 2/1994 |
| JP | 06-266616 | 9/1994 |
| JP | 08-185383 | 7/1996 |
| JP | 08-255107 | 10/1996 |
| JP | 10-228413 | 8/1998 |
| JP | 2000-268006 | 9/2000 |
| JP | 2001265539 A | 9/2001 |
| KR | 00/0067533 | 11/2000 |
| TW | 387072 | 4/2000 |
| TW | 491970 | 6/2002 |
| WO | WO 93/18459 | 9/1993 |
| WO | WO 93/19422 | 9/1993 |
| WO | 97-04401 | 2/1997 |
| WO | 99-23570 | 5/1999 |
| WO | 99-34294 | 7/1999 |
| WO | WO-00/26798 | 5/2000 |
| WO | 00-43902 | 7/2000 |
| WO | WO 02/27499 A2 | 4/2002 |
| WO | WO 03/104996 | 12/2003 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/ 1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Hellwagner, Hermann et al., *"Enabling a PC Cluster for High-Performance Computing"*, The Speedup Journal, vol. 11, No. 1, Jun. 1997, pp. 1-9.

\* cited by examiner

MEMORY HUB AND ACCESS METHOD HAVING A SEQUENCER AND INTERNAL ROW CACHING

This application is a continuation of U.S. patent application No. 10/213,038, filed Aug. 5, 2002, U.S. Pat. No. 7,117,316.

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

One technique that has been used to reduce latency in memory devices is a cache memory, which stores data recently accessed from system memory. The cache memory is generally in the form of a static random access memory ("SRAM"), which has a substantially shorter access time compared to dynamic random access memory ("DRAM") typically used as system memory. Furthermore, the SRAM cache memory is generally coupled directly to the processor through a processor bus rather than through a system controller or the like as is typical with DRAM system memory. As a result of the faster speed of cache memory and the closer proximity of cache memory to the processor, the use of cache memory can greatly reduce the latency of memory read operations.

Although conventional cache memory has reduced memory access latencies in conventional computer systems, cache memory has not been used in a manner that provides optimum performance in computer systems using memory hubs. In particular, the limited storage capacity of typical cache memories compared to the vastly larger capacity of typical memory hub system memories makes cache memory of lesser value since a cache hit is less likely to occur. This problem is exacerbated by the difficulty in transferring data to cache memory that is likely to be the subject of subsequent memory requests. More specifically, it is difficult to couple the data that will subsequently be needed from all of the memory modules through the memory controller to the processor and then from the processor to the cache memory. Also, it can be difficult to maintain cache coherency in a computer system using memory hubs and a cache memory coupled to the processor through the processor bus, and it can require significant hardware resources to maintain cache coherency. Furthermore, the time required to maintain cache coherency can slow memory performance to the extent that much of the performance advantages of using cache memory can be lost.

There is therefore a need for a computer architecture that provides the advantages of a memory hub architecture and also minimize this latency problems common in such systems, thereby providing a memory devices with high bandwidth and low latency.

SUMMARY OF THE INVENTION

A plurality of memory modules are coupled to a controller in a computer system. Each of the memory modules includes a plurality of memory devices and a memory hub. The memory hub comprises a link interface coupled to the controller and a memory device interface coupled to the memory devices. The link interface receives memory requests from the controller for access to a row of memory cells in at least one of the memory devices. The link interface transfers the memory requests to the memory device interface, which then couples the memory requests to the memory devices for access to a row of memory cells in at least one of the memory devices. The memory device interface then receives the read data from the memory devices responsive to at least some of the memory requests. Each of the memory hubs also includes a row cache memory coupled to the memory device interface for receiving and storing read data responsive to at least one of the memory requests. A sequencer that is also included in the memory hub is coupled to the link interface, the memory device interface and the row cache memory. The sequencer generates and couples to the memory device interface memory requests to read data from memory cells in a row of memory cells being accessed responsive to a memory request transferred from the link interface to the memory device interface. The read data from the memory cells in the row of memory cells being accessed responsive to the generated memory requests are also stored in the row cache memory. The sequencer preferably generates the memory requests when memory requests are not being received from the controller.

DETAILED DESCRIPTION OF THE INVENTION

Figure 1:
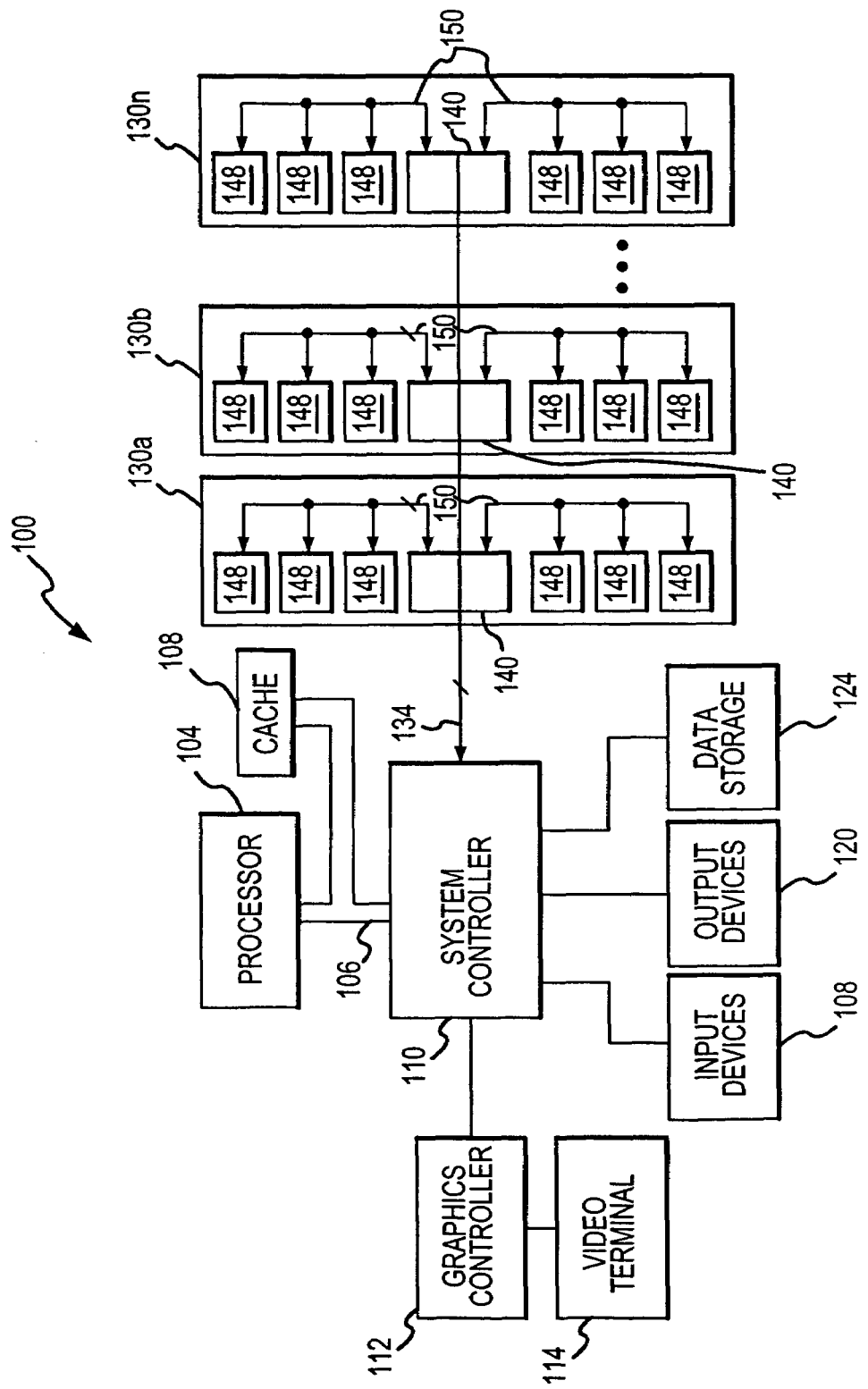
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a,b . . . n, which serve as system memory for the computer system 100. The memory modules 130 are preferably coupled to the system controller 110 through a high-speed link 134, which may be an optical or electrical communication path or some other type of communications path. In the event the high-speed link 134 is implemented as an optical communication path, the optical communication path may be in the form of one or more optical fibers, for example. In such case, the system controller 110 and the memory modules will include an optical input/output port or separate input and output ports coupled to the optical communication path. The memory modules 130 are shown coupled to the system controller 110 in a multi-drop arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the system controller 110. A switching topology may also be used in which the system controller 110 is selectively coupled to each of the memory modules 130 through a switch (not shown). Other topologies that may be used will be apparent to one skilled in the art.

Figure 2:
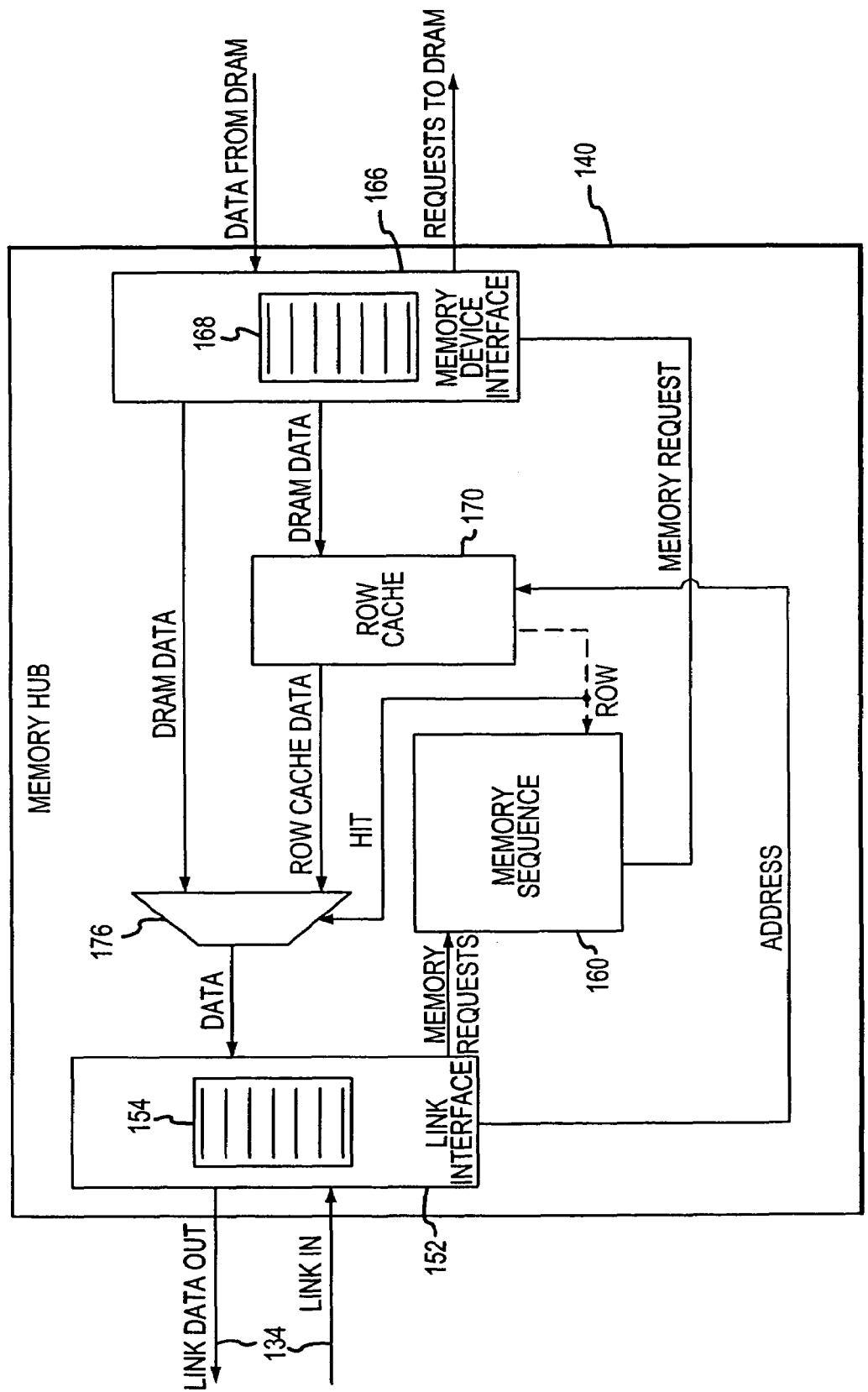
FIG. 2 is a block diagram of a memory hub used in the computer system of FIG. 1.

Each of the memory modules 130 includes a memory hub 140 for controlling access to 6 memory devices 148, which, in the example illustrated in FIG. 2, are synchronous dynamic random access memory ("SDRAM") devices. However, a fewer or greater number of memory devices 148 may be used, and memory devices other than SDRAM devices may, of course, also be used. The memory hub 140 is coupled to each of the system memory devices 148 through a bus system 150, which normally includes a control bus, an address bus and a data bus.

One example of the memory hub 140 of FIG. 1 is shown in FIG. 2. The memory hub 140 includes a link interface 152 that is coupled to the high-speed link 134. The nature of the link interface 152 will depend upon the characteristics of the high-speed link 134. For example, in the event the high-speed link 134 is implemented using an optical communications path, the link interface 152 will include an optical input/output port and will convert optical signals coupled through the optical communications path into electrical signals. In any case, the link interface 152 preferably includes a buffer, such as a first-in, first-out buffer 154, for receiving and storing memory requests as they are received through the high-speed link 134. The memory requests are stored in the buffer 154 until they can be processed by the memory hub 140.

When the memory hub 140 is able to process a memory request, one of the memory requests stored in the buffer 154 is transferred to a memory sequencer 160. The memory sequencer 160 converts the memory requests from the format output from the system controller 110 into a memory request having a format that can be used by the memory devices 148. These re-formatted request signals will normally include memory command signals, which are derived from memory commands contained in the memory request received by the memory hub 140, and row and column address signals, which are derived from an address contained in the memory request received by the memory hub 140. In the event the memory request is a write memory request, the re-formatted request signals will normally include write data signals which are derived from write data contained in the memory request received by the memory hub 140. For example, where the memory devices 148 are conventional DRAM devices, the memory sequencer 160 will output row address signals, a row address strobe ("RAS") signal, an active high write/active low read signal ("W/R*"), column address signals and a column address strobe ("CAS") signal. The re-formatted memory requests are preferably output from the sequencer 160 in the order they will be used by the memory devices 148.

The memory sequencer 160 applies the re-formatted memory requests to a memory device interface 166. The nature of the memory device interface 166 will again depend upon the characteristics of the memory devices 148. In any case, the memory device interface 166 preferably includes a buffer, such as a FIFO buffer 168, for receiving and storing one or more memory requests as they are received from the link interface 152. The memory requests are stored in the buffer 168 until they can be processed by the memory devices 148. However, in the event the memory device interface 166 stores several memory requests, the memory device interface 166 may re-order the memory requests so that they are applied to the memory devices in some other order. For example, the memory requests may be stored in the interface 166 in a manner that causes one type of request, e.g., read requests to be processed before other types of requests, e.g., write requests.

The memory requests are described above as being received by the memory hub 140 in a format that is different from the format that the memory requests are applied to the memory devices 148. However, the system controller 110 may instead re-format memory requests from the processor 104 (FIG. 1) to a format that can be used by the memory devices 148. In such case, it is not necessary for the sequencer 160 to re-format the memory request. Instead, the sequencer 160 simply schedules the re-formatted memory request signals in the order needed for use by the memory devices 148. The memory request signals for one or more memory requests are then transferred to the memory device interface 166 so they can subsequently be applied to the memory devices 148.

As previously explained, one of the disadvantages of using memory hubs is the increased latency they can sometimes create. As also previously explained, a cache memory in the processor 104 or coupled to the processor bus 106 (FIG. 1), which is the traditional approach to reducing memory read latency, is not well suited to a memory system using memory hubs. The memory hub 140 example shown in FIG. 2 provides relatively low memory read latency by including a row cache memory 170 in each of the memory hubs 140. The row cache memory 170 may be similar in design to conventional cache systems including a data memory (not shown), a tag memory (not shown), and conventional address comparison logic (not shown). The row cache memory 170 stores data contained in one or more previously addressed rows of memory cells in one or more of the memory devices 148 in the module 140. The row cache memory 170 receives addresses forming part of a memory request from the link interface 152, which are compared to addresses of cached data. In the event of an address match, which indicates that the data being fetched by the memory request is stored in the row cache memory 170, the memory 170 outputs the requested data and a "ROW HIT" signal indicative of a cache hit. The ROW HIT signal is applied to a multiplexer 176 to cause the data from the cache memory 170 to be coupled to the link interface 152. In the event of a row cache miss, the multiplexer 176 couples data from the memory device interface 166 to the link interface 152. The ROW HIT signal is also applied to the memory sequencer 160 so that the sequencer will not couple the memory request to the memory device interface 166 in the event of a row hit since the data called for by the memory request has already been supplied by the row cache memory 170.

Although the row cache memory 170 may store data only from columns in a row that have been previously accessed, the memory 170 preferably pre-fetches data from many or all of the columns in the cached row when the memory hub 140 is not busy responding to memory requests from the system controller 110. More specifically, the memory sequencer 160 contains conventional circuitry to keep track of which columns of a row being accessed have had the data stored therein transferred to the row cache memory 170. When the sequencer 160 is not busy servicing memory requests from the link interface 152, the sequencer 160 generates memory requests, which are applied to the memory device interface 166, to cause data stored in the remaining columns of an addressed row to be transferred to the row cache memory 170. As a result, since memory accesses are typically to a series of memory locations in the same row, the row cache memory 170 is likely to be storing data that will be fetched in subsequent memory requests.

The memory hub 140 can process a subsequent memory request directed to a new row of memory cells in one of the memory devices 148 using a variety of procedures. For example, if the row cache memory 170 is capable of storing data from more than one row, the sequencer 160 can simply cause the data stored in the subsequently accessed row to be transferred to the row cache memory 170. If the row cache memory 170 is capable of storing data from only a single row of memory cells, or the cache memory 170 has otherwise reached its storage capacity, the data stored in the newly accessed row of memory cells can simply overwrite the previously stored data.

Although not shown in FIG. 2 or discussed above, the memory hub 140 preferably includes circuitry for maintaining cache consistency using conventional memory cache techniques. For example, the hub 140 may employ a "write through" mode of operation or a "write back" mode of operation in the event of a memory request for a write to a location followed by a memory request for a read from that same location.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory module, comprising:
   a plurality of memory devices; and
   a memory hub, comprising:
   a link interface receiving a memory request for access to a row of memory cells in at least one of the memory devices, wherein the memory request includes a read request to read data from a series of memory cells within the row of memory cells and wherein the series of memory cells in the row of memory cells comprises less than all the memory cells in the row of memory cells;
   a memory device interface coupled to the memory devices, the memory device interface being operable to couple the memory request to the memory devices in an order different than an order the memory requests are received to access memory cells in the row of memory cells in at least one of the memory devices and to receive read data from the series of memory cells responsive to the read request included in the memory request;
   a sequencer coupled to the link interface and the memory device interface, the sequencer configured to keep track of remaining memory cells in the row of memory cells not included in the series of memory cells in the row of memory cells read responsive to the received memory request, the sequencer further being configured to generate memory requests and couple to the memory device interface the generated memory requests to read data from the remaining memory cells in the same row of memory cells being accessed responsive to the memory request being coupled from the memory device interface to the at least one memory device, wherein the remaining memory cells in the same row of memory cells excludes the series of memory cells in the row of memory cells accessed responsive to the memory request, the sequencer being operable to generate and couple to the memory device the generated memory requests to read data only when memory requests are not being transferred from the link interface to the memory device interface, the read data read from the other memory cells in the same row of memory cells being accessed being stored in a row cache memory; and the row cache memory coupled to the memory device interface and the sequencer configured to receive and store the read data from the remaining memory cells in the same row of memory cells being accessed responsive to the generated memory requests.

2. The memory module of claim 1 wherein the memory device interface further comprises a first-in, first-out buffer that is operable to receive and to store memory requests received from the link interface and from the sequencer and to transfer the stored memory requests to the at least one memory device in the order in which they were received.

3. The memory module of claim 1 wherein the link interface comprises a first-in, first-out buffer that is operable to receive and store memory requests and to transfer the stored memory requests to the memory device interface in the order in which they were received.

4. The memory module of claim 3 wherein the memory device interface further comprises a first-in, first-out buffer that is operable to receive and store memory requests received from the link interface and from the sequencer and to transfer the stored memory requests to the at least one memory device in the order in which they were received.

5. The memory module of claim 1 wherein the link interface comprises an optical input/output port.

6. The memory module of claim 1 wherein the memory devices comprises dynamic random access memory devices.

7. The memory module of claim 1 wherein the sequencer is operable to output an address contained in each read memory request received from the link interface, and wherein the row cache memory is operable to receive the addresses from the sequencer to determine if data called for by the memory request is stored in the row cache memory, the row cache memory outputting the read data and generating a hit signal if the data called for by the memory request is stored in the row cache memory and generating a row miss signal if the data called for by the memory request is not stored in the row cache memory.

8. The memory module of claim 7 further comprising a multiplexer having data inputs coupled to the row cache memory and to the memory device interface, a data output coupled to the link interface and a control input coupled to receive the row cache hit and row cache miss signals from the row cache memory, the multiplexer coupling read data from the memory device interface responsive to the row cache miss signal and coupling read data from the row cache memory responsive to the row cache hit signal.

9. A memory module, comprising:
a plurality of memory devices; and
a memory hub, comprising:
 a link interface receiving memory requests, wherein each memory request is for access to a series of memory cells in a row of memory cells in at least one of the memory devices and the series of memory cells in a row of memory cells is less than all the memory cells in that row of memory cells;
 a memory device interface coupled to the memory devices, the memory device interface configured to re-order how the memory requests are applied to the plurality of memory devices and further configured to couple each re-ordered memory request to the memory devices for access to a respective series of memory cells in a row of memory cells in at least one of the memory devices and to receive read data responsive to at least some of the memory requests, at least some of the memory requests coupled to the memory devices being responsive to memory requests transferred from the link interface to the memory device interface, wherein the memory device interface re-orders the memory requests to apply read requests before write requests;
 a sequencer coupled to the link interface and the memory device interface and the row cache memory, the sequencer being operable to convert memory request received by the link interface into memory device memory requests provided to the memory device interface, the format of the memory device memory requests different than memory requests received by the link interface, the sequencer being operable to output an address contained in each read memory request received from the link interface, the sequencer further being operable to output an address other than an address contained in a read memory request received from the link interface, wherein the address other than the address contained in the read memory request received from the link interface includes an address for other memory cells in the row of memory cells not accessed by the address contained in the read memory request;
 a row cache memory coupled to the memory device interface for receiving and storing read data from the other memory cells in the row of memory cells responsive to the address other than the address contained in one of the memory read requests being coupled from the memory device interface to the at least one memory device, device, the row cache memory further being operable to receive the addresses from the sequencer to determine if data called for by the memory request is stored in the row cache memory, the row cache memory outputting the read data and generating a hit signal if the data called for by the memory request is stored in the row cache memory and generating a row miss signal if the data called for by the memory request is not stored in the row cache memory; and
 a multiplexer having data inputs coupled to the row cache memory and to the memory device interface, a data output coupled to the link interface and a control input coupled to receive the row cache hit and row cache miss signals from the row cache memory, the multiplexer coupling read data from the memory device interface responsive to the row cache miss signal and coupling read data from the row cache memory responsive to the row cache hit signal.

10. The memory module of claim 9 wherein the memory device interface further comprises a buffer that is operable to receive and store memory requests from the link interface and from the sequencer.

11. The memory module of claim 9 wherein the link interface comprises a first-in, first-out buffer that is operable to receive and store memory requests and to transfer the stored memory requests to the memory device interface in the order in which they were received.

12. The memory module of claim 11 wherein the memory device interface further comprises a buffer that is operable to receive and store memory requests received from the link interface and from the sequencer.

13. The memory module of claim 9 wherein the link interface comprises an optical input/output port.

14. The memory module of claim 9 wherein the memory devices comprises dynamic random access memory devices.

15. A memory hub, comprising:
a link interface receiving memory requests, at least some of the memory requests including an address for a series of memory cells in a row of memory cells, wherein the series of memory cells in the row of memory cells is less than all of the memory cells in the row of memory cells;
a memory device interface operable to re-order formatted memory requests and apply the re-ordered formatted memory requests to the memory devices and to receive read data responsive to at least some of the formatted memory requests, at least some of the formatted memory requests output by the memory device interface being responsive to memory requests transferred from the link interface to the memory device interface;
a row cache memory coupled to the memory device interface for receiving and storing read data received from the memory device interface based on at least one of the formatted memory requests being output from the memory device interface; and
a sequencer coupled to the link interface and the memory device interface and the row cache memory, the sequencer being operable to format memory requests received by the link interface into a different format to provide formatted memory requests to the memory device interface generated memory requests to read data from memory cells in the row of memory cells not included in a respective received memory request, the sequencer being operable to generate and couple to the memory device interface the generated memory requests to read data when memory requests are not being transferred from the link interface, the read data read responsive to the generated memory requests from the sequencer being stored in the row cache memory.

16. The memory hub of claim 15 wherein the memory device interface further comprises a buffer that is operable to receive and store memory requests received from the link interface and from the sequencer.

17. The memory hub of claim 15 wherein the link interface comprises a first-in, first-out buffer that is operable to receive and store memory requests and to transfer the stored memory requests to the memory device interface in the order in which they were received.

18. The memory hub of claim 17 wherein the memory device interface further comprises a buffer that is operable to receive and store memory requests received from the link interface and from the sequencer.

19. The memory hub of claim 15 wherein the link interface comprises an optical input/output port.

20. The memory hub of claim 15 wherein the sequencer is operable to output an address contained in each read memory request received from the link interface, and wherein the row cache memory is operable to receive the addresses from the sequencer to determine if data called for by the memory request is stored in the row cache memory, the row cache memory outputting the read data and generating a hit signal if the data called for by the memory request is stored in the row cache memory and generating a row miss signal if the data called for by the memory request is not stored in the row cache memory.

21. The memory hub of claim 20 further comprising a multiplexer having data inputs coupled to the row cache memory and to the memory device interface, a data output coupled to the link interface and a control input coupled to receive the row cache hit and row cache miss signals from the row cache memory, the multiplexer coupling read data from the memory device interface responsive to the row cache miss signal and coupling read data from the row cache memory responsive to the row cache hit signal.

22. A method of reading data in each of a plurality of memory modules using a controller coupled to the memory modules, the method comprising:
receiving, by a memory hub, memory requests from the controller by a first one of the memory modules, at least one of the memory requests being a request to access a series of memory cells in a row of memory cells of at least one memory device in a plurality of memory devices included in the first memory module, wherein the series of memory cells in the row of memory cells includes less than all of the memory cells in the row of memory cells;
re-ordering, by a memory device interface in the memory hub, the received memory requests;
coupling, by the memory hub, re-ordered memory requests to the at least one memory device in the first memory module;
generating, by a sequencer in the memory hub, requests to read data from other memory cells in the same row of memory cells accessed responsive to the at least one of the memory requests being a request to access the series of memory cells in the row of memory cells of the at least one memory device, the requests being generated when memory requests from the controller are not being coupled to the at least one memory device;
re-ordering, by a memory device interface in the memory hub, the received and generated memory requests;
coupling, by the memory hub, the generated memory requests to the at least one memory device; and
storing in cache memory in the first memory module read data responsive to the generated memory requests.

23. The method of claim 22, further comprising, in response to a memory request from the controller to read data from the first memory module:
determining if the read data are stored in the cache memory;
if the read data are stored in the cache memory, transferring the requested read data from the cache memory to the controller; and
if the read data are not stored in the cache memory, transferring the requested read data from the at least one memory device to the controller.

24. The method of claim 22 wherein the act of receiving memory requests from the controller by a first one of the memory modules comprises receiving optical signals corresponding to the received memory requests.

25. The method of claim 22 wherein the memory devices included in the first memory module comprises dynamic random access memory devices.

* * * * *

UNITED STATES PATENT AND TRADEMARK OFFICE
CERTIFICATE OF CORRECTION

PATENT NO. : 8,954,687 B2
APPLICATION NO. : 11/139274
DATED : February 10, 2015
INVENTOR(S) : Joseph M. Jeddeloh Page 1 of 1

It is certified that error appears in the above-identified patent and that said Letters Patent is hereby corrected as shown below:

In the claims,

In column 8, line 43, in Claim 9, delete "device, device," and insert -- device, --, therefor.

In column 8, line 64, in Claim 10, delete "from" and insert -- received from --, therefor.

In column 9, line 36, in Claim 15, delete "interface" and insert -- interface, the sequencer being further operable to generate and couple to the memory device interface --, therefor.

Signed and Sealed this
Twelfth Day of May, 2015

Michelle K. Lee
*Director of the United States Patent and Trademark Office*